(12) United States Patent
Lee et al.

(10) Patent No.: US 6,850,188 B1
(45) Date of Patent: Feb. 1, 2005

(54) COMBINED GLOBAL POSITIONING SYSTEM RECEIVER AND RADIO WITH ENHANCED DISPLAY FEATURES

(75) Inventors: Wai C. Lee, Olathe, KS (US); Scott T. Moore, Olathe, KS (US); John H. Lovitt, Spring Hill, KS (US); Gregory J. Hammes, Overland Park, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/116,890

(22) Filed: Apr. 5, 2002

(51) Int. Cl.[7] .............................................. H04B 7/185
(52) U.S. Cl. ........................... 342/357.08; 342/357.09; 342/357.1
(58) Field of Search .................... 342/357.08–357.1

(56) References Cited

U.S. PATENT DOCUMENTS

| | | | |
|---|---|---|---|
| 5,043,736 A | 8/1991 | Darnell et al. ............... 342/357 |
| 5,202,829 A | * 4/1993 | Geier .................... 342/357.08 |
| 5,592,382 A | * 1/1997 | Colley ................... 342/357.08 |
| 5,689,269 A | 11/1997 | Norris ......................... 342/357 |
| 5,689,809 A | 11/1997 | Grube et al. ............... 455/54.1 |
| 5,781,150 A | * 7/1998 | Norris .................... 342/357.08 |
| 5,848,373 A | 12/1998 | DeLorme et al. ........... 701/200 |
| 5,952,959 A | 9/1999 | Norris ........................ 342/357 |
| 6,002,982 A | 12/1999 | Fry .............................. 701/213 |
| 6,148,262 A | 11/2000 | Fry .............................. 701/213 |
| 6,236,358 B1 | * 5/2001 | Durst et al. ............ 342/357.09 |
| 6,246,376 B1 | * 6/2001 | Bork et al. ............. 342/357.13 |
| 6,373,430 B1 | 4/2002 | Beason et al. ......... 342/357.09 |
| 6,430,498 B1 | * 8/2002 | Maruyama et al. .... 342/357.08 |
| 6,504,503 B1 | * 1/2003 | Saint-Hilaire et al. . 342/357.08 |
| 6,556,899 B1 | * 4/2003 | Harvey et al. ......... 342/357.09 |
| 2003/0080897 A1 | * 5/2003 | Tranchina et al. ....... 342/357.1 |

OTHER PUBLICATIONS

NavTalk Cellular Phone/GPS Receiver: Owners Manual and Reference Guide, Garmin Corporation, Jan. 2000.*

* cited by examiner

Primary Examiner—Bernarr E. Gregory
Assistant Examiner—Fred H Mull
(74) Attorney, Agent, or Firm—Devon A. Rolf

(57) ABSTRACT

A portable GPS/radio unit (10) communicates over a wireless radio network (12) with at least one other such unit (10A–10E). The unit (10) may transmit radio signals over the network (12) indicative of the unit's location and receive similar radio signals from other such units. The unit (10) is operable to display an indication of the distance between two or more units, an indication of the amount of time that has elapsed since location data was last received from another unit, a track log or track back information for another unit, and an indication if the unit (10) is about to lose communications with another unit. The unit (10) also may be operated to gather and transmit to other units location data corresponding to way points. The perspective or vantage point from which location data and other information is viewed may be selected or changed by the user of the unit (10).

20 Claims, 4 Drawing Sheets

COMBINED GLOBAL POSITIONING SYSTEM RECEIVER AND RADIO WITH ENHANCED DISPLAY FEATURES

BACKGROUND OF THE INVENTION

1. Field of the Invention

The present invention relates to radios and global positioning system (GPS) receivers. More particularly, the invention relates to a combined GPS receiver and radio unit operable for sending and receiving GPS-derived location data and other information.

2. Description of the Prior Art

The global positioning system (GPS) is an electronic satellite navigation system which permits users to determine their position with respect to the Earth. Global positioning may be determined with a handheld GPS receiver which detects and decodes signals from a number of satellites orbiting the Earth. The signals from each of these satellites indicate the position of the satellite and the time at which the signals were sent. To decode the satellite signals, known as spread spectrum signals, and thereby calculate desired position and navigational data, a GPS receiver must first "find" or acquire the signals emitted from a minimum number of satellites. Once the receiver is "locked on" to the spread spectrum signals, the user's global position and other navigational data (e.g., velocity of movement) can be calculated.

In addition to the growing popularity and demand for GPS navigational devices, portable two-way radios continue to enjoy widespread popularity. In 1996, the Federal Communications Commission (FCC) established the Family Radio Service (FRS) so that families and other small groups could communicate with one another over very short distances (typically less than two miles) at no charge and without an FCC license. The FRS, which is one of the Citizens Band Radio Services, includes 14 channels in the UHF 465 MHz band. There are a number of commercially available two-way radios which are designed for use with the FRS.

The increasing use of both portable radios and GPS receivers has led to proposals to incorporate the two into combined units. It is anticipated that such combined units will provide enhanced capabilities such as the ability to transmit GPS-derived location data between two or more units so that the users of the units may monitor each other's location. For example, a family may use several of these combined units to not only communicate with one another but also to monitor each other's location so that parents may keep track of their children.

Unfortunately, currently-proposed combined GPS/radio units suffer from several limitations that limit their utility. For example, proposed designs provide no means for users to determine their distance from other radio users in their group or family. Such information is often useful, for example, so that parents may ensure that their children have not wandered too far off or so that hikers may accurately assess the distance between themselves and other hikers in their group.

Another limitation of currently-proposed combined GPS/radio units is that transmitted location data quickly becomes stale or outdated as the units move from place to place. This is a problem because a user may incorrectly rely upon previously-transmitted location data to determine the location of another user. For example, a parent may incorrectly assume that one of their children is in a particular location based on previously-transmitted location data and then later discover that the child has since wandered to a different location.

Another limitation of currently-proposed combined GPS/radio units is that, although they can display the location of other such units, they are not operable to display other useful location-type information for other units such as track logs and track back information. These types of information can be beneficial in search and rescue missions and other related applications.

Another limitation of currently-proposed combined GPS/radio units is that they provide no means for users to gather and transmit to other units location data for way points such as campsites, trail heads, and bodies of water. Instead, users who currently desire to display such way point location data must personally visit each way point to obtain its GPS-derived location.

Another limitation of currently-proposed combined GPS/radio units is that they permit the display of location data from one perspective only. This is a problem because it is often desirable to change the perspective or vantage point from which such information is viewed to compensate for movement of the units.

Another limitation of currently-proposed combined GPS/radio units is that users often unknowingly move beyond the communication range of the units and therefore lose communications. As mentioned above, the range of FRS radios is typically less than two miles, but many people often use FRS devices to communicate with others while hiking, skiing, boating, and other such activities where they may become separated by more than two miles. In an attempt to prevent loss of communications, many FRS radios have a signal strength indicator that provides an alert when its received signal strength begins to drop. Unfortunately, however, such indicators typically only provide such alerts after communications have already been lost or seriously degraded.

Accordingly, there is a need for an improved combined GPS/radio unit that overcomes the limitations of the prior art.

SUMMARY OF THE INVENTION

The present invention solves the above-described problems and provides a distinct advance in the art of radios in general, and combined GPS/radio units in particular. One embodiment of the present invention provides a combined GPS/radio unit that is operable to display not only an indication of the location of other such units, but also the distance between two or more units. This permits a user to closely monitor the location of other users and to accurately assess the distance between himself or herself and the other users. In preferred forms, this is accomplished by displaying a plurality of radii rings around the displayed location of the user's unit, wherein the radii rings each correspond to a particular distance. This enables a user to quickly determine the distance between his or her unit and any other unit for which location data has been received and displayed. The distance between units may also be represented by a line segment extending between the displayed location of two units and text representative of the distance.

Another embodiment of the present invention provides a combined GPS/radio unit operable to receive and display location data from other such units and to count the amount of time that has elapsed since location data was last received from each of the units. The unit then alerts the user whenever location data for another unit has not been updated within a predetermined time interval. The alert may take the form of an elapsed time counter displayed alongside the displayed location of each unit or a flag, color coding, or other marker to indicate that position data has become stale.

Another embodiment of the present invention provides a combined GPS/radio unit that is operable to display additional location-type information for other units such as track logs and track back information. A similar embodiment of the invention allows users to gather location data for way points such as campsites, trail heads, and bodies of water and to transmit the location data along with textual identifiers to other units. The other units may then display indications of the locations of the way points and the textual identifiers so that all units in communication with one another may display such information without requiring each user to personally visit each way point.

Another embodiment of the present invention provides a combined GPS/radio unit that permits a user to selectively change the perspective or vantage point from which location data and other information may be viewed. This permits a user to select a perspective from which to view the position of other units and way points and to then change the perspective, if desired, as the units move.

Another embodiment of the present invention provides a combined GPS/radio unit that is operable to provide an alert if it becomes separated by more than a pre-determined distance from another unit. The alert is based on GPS-derived location data for the units, not the received signal strength between the units, and therefore may be configured to provide an alert before communications are degraded or lost. For example, the predetermined distance may be set to one mile even though the units have a communications range of two miles so that the alert is triggered before communications are actually lost or degraded.

The inventive features of each of the radios described above are preferably implemented in a combined GPS/radio unit; however, they may also be implemented in other radio and communications devices. Also, although each of the radios described above preferably communicate over the FRS, they may also communicate over other wireless networks.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
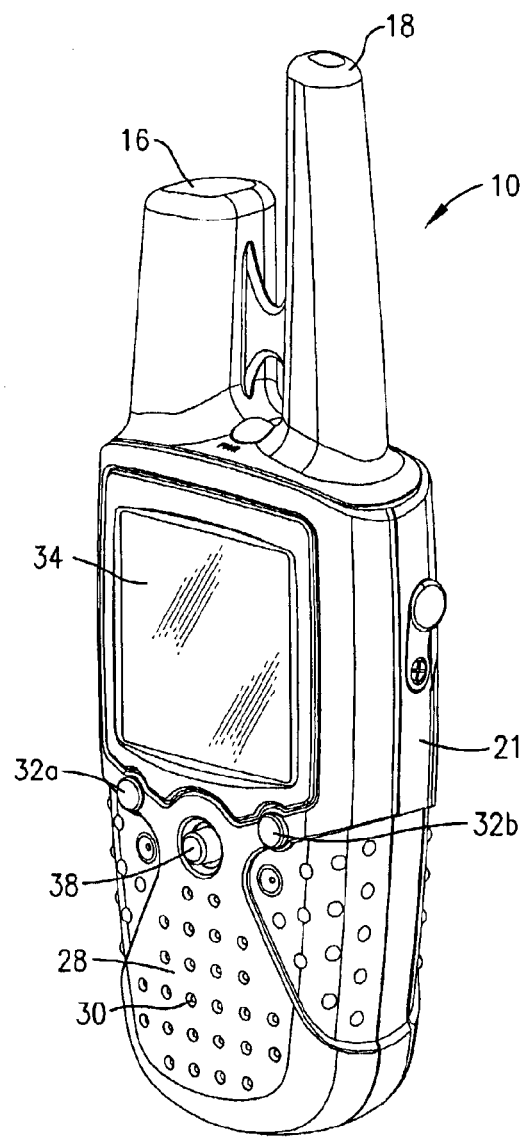
FIG. 1 is a perspective view of a combined GPS/radio unit constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 3:
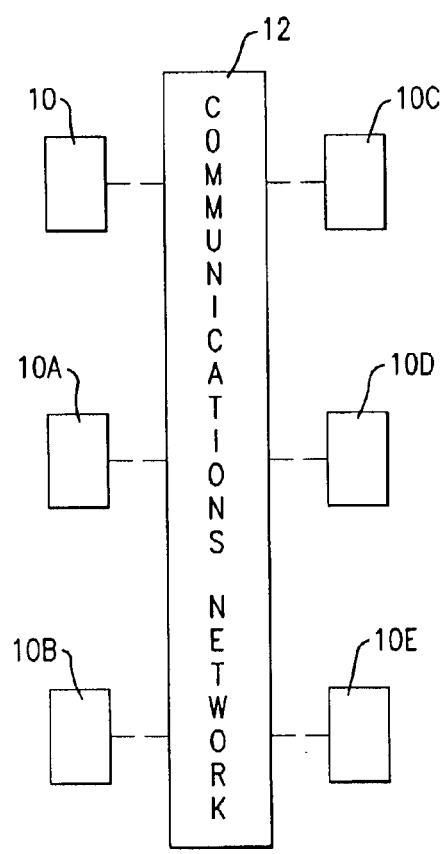
FIG. 3 is a block diagram of a communications network linking the GPS/radio unit of FIG. 1 with a plurality of other GPS/radio units.
Figure 2:
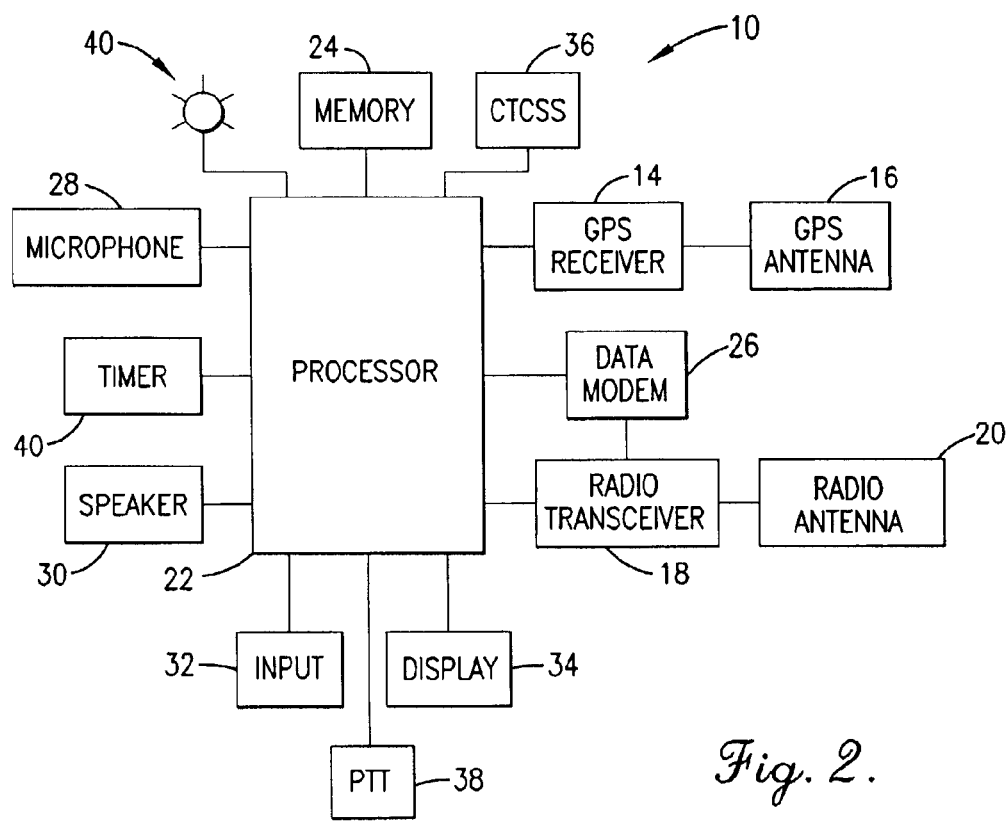
FIG. 2 is a block diagram of the components of the GPS/radio unit of FIG. 1.

Turning now to the drawing figures, and particularly FIGS. 1–3, a portable radio unit 10 constructed in accordance with a preferred embodiment of the invention is illustrated. The radio 10 is preferably a combined GPS/radio unit that may transmit and receive voice communications, determine its location using the GPS, and transmit location data and other information to other such units 10A, 10B, 10C, 10D and 10E over a wireless network 12. In the preferred embodiment of the present invention, units 10 and 10A–10E communicate with one another over a public radio network such as the Family Radio Service (FRS); however, the network 12 may also be a cellular radio network, a personal communications service (PCS) network, or any other conventional wireless communications network. While six units 10 and 10A–10E are shown on the exemplary embodiment of FIG. 3, only two such units are necessary for the purposes of the present invention.

Referring to FIGS. 1 and 2, the preferred unit 10 comprises a GPS receiver 14, a GPS antenna 16, a radio transceiver 18, and a radio antenna 20 all mounted in or on a radio housing 21. The GPS receiver 14 is electronically coupled with a processor 22 which has an associated memory 24 for storing information such as cartographic data (i.e., electronic maps). Similarly, the radio transceiver 18 is coupled with the processor 22 and a data modem 26. The data modem is used for transmitting and receiving data such as location data as described herein. The cartographic data may be stored on cartridges which can be removably attached to the unit 10. For example, an electronic map of a particular city or national park may be stored in a single cartridge. The memory 24 may also store historical location data for the unit 10 or for other units which have transmitted location data to unit 10. The antennas 16, 20 preferably extend upwardly from the top of the housing 21.

The unit 10 also includes a microphone 28, a speaker 30, an input 32, and a display 34. The microphone 28 and the speaker 30 are conventional and may be, for example, the same type of microphone and speaker equipped with a standard FRS radio. The display 34 is preferably a liquid crystal display (LCD) and is used to display location information and cartographic data as described in more detail below.

The input 32 may be an alphanumeric keypad (not shown), such as a telephone keypad which may be used to type in names, identifiers, and text or a plurality of control buttons (32a, 32b in FIG. 1), which may be used to operate drop-down menus to select and input names or other identifiers. The input 32 may include any number of control buttons such as the twelve buttons standard on a telephone keypad. As will be understood, the input 32 could be something other than a keypad or control buttons, such as a microphone/voice recognition input, a touch screen, or a menu-driven display input.

The unit 10 may also include a continuous tone coded squelch system (CTCSS) 36 that controls the audio output of the speaker 30 so that only certain desired communications are heard by a user of the unit 10. The CTCSS 36 includes circuitry for creating a plurality of sub-audible tones and a selector for selecting one of the tones. The selector may be a key or button on the input 32 or a dedicated key or button positioned elsewhere on the unit 10. When enabled, the CTCSS 36 transmits the selected sub-audible tone with all voice communications. Other nearby units 10A–10E will receive the sub-audible tone along with all transmitted voice communications and disable their squelch if they have a similar CTCSS 36 that has been set to the same sub-audible tone. This allows a group of users to set their units to the same sub-audible tone and then communicate with one another without hearing communications transmitted by radios with a different or no CTCSS 36 sub-audible tone.

The unit 10 also preferably includes a push-to-talk button 38 such as those normally found on FRS radios. The push-to-talk button 38 may be coupled with the processor 22 to both initiate transmission of voice communications and transmission of location data such as a GPS-derived location of the unit. Transmission of such location data may also be initiated by the control buttons 32a, 32b.

The unit 10 also preferably includes a timer 40 or other counting device that counts the amount of time that has elapsed since location data was last received from other such units as described in more detail below. The timer 40 may be a standalone timing or counting device coupled with the processor 22 or may be integral to the processor 22.

In use, the unit 10 communicates with other GPS/radio units (e.g., units 10A–10E) over the wireless network 12 in the same manner that conventional two-way radios communicate with one another. In addition, these units are able to calculate their location and communicate that location data to one another since they are also equipped with GPS receivers. Transmission of the location data may be triggered by the push-to-talk button 38 as described above. Another way to communicate the location data over the wireless network 12 is to divide the available bandwidth into a voice portion and a data portion so that voice and data may be communicated simultaneously. If only a small portion of the bandwidth is allocated for data transmission, there should be no noticeable degradation of the voice communication. Alternatively, the entire communication channel could be used for voice communication except for periodic interruptions during which a burst of location data is sent. If the period of the interruption is short, there should be no noticeable effect on the quality of the voice communication. The data may be transmitted using one of a variety of different modulation techniques, including frequency shift keying (FSK), minimum shift keying (MSK), or phase shift keying (PSK).

Figure 4:
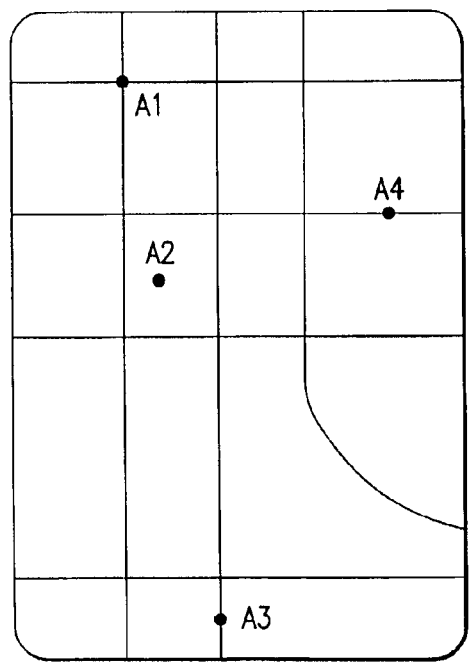
FIG. 4 is a schematic representation of a display on the GPS/radio unit of FIG. 1, wherein the display indicates the location of multiple GPS/radio units on an electronic map.

FIG. 4 is a schematic representation of an exemplary display 34 on the unit 10 in which the display 34 indicates the location of four different GPS/radio units. Although darkened circles are used in FIG. 4 to indicate the location of the four units, any other location designator could be used. The display 34 also indicates a unique alphanumeric identifier for each of the four units. For example, the identifiers A1, A2, A3, and A4 may correspond to units 10A, 10B, 10C, and 10D, in which case the location of unit 10 would not be shown. Alternatively, the identifier A1 may correspond to unit 10 and the identifiers A2–A4 may correspond to units 10A-1° C. so that the location of unit 10 is shown on its display 34. While alphanumeric identifiers were selected in the example of FIG. 4, any available identifier (or combination of identifiers) could be used (e.g., letters, numbers, symbols, icons, colors, etc.) for the units. Moreover, an identifier could perform the dual function of identifying the unit and of indicating the location of the unit, thus eliminating the need for a darkened circle or other such location designator.

Figure 5:
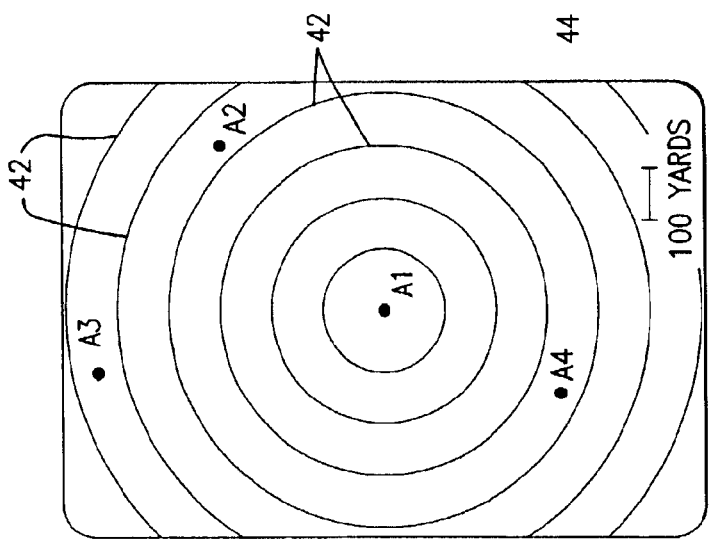
FIG. 5 is a schematic representation of a display on the GPS/radio unit of FIG. 1, wherein the display indicates the location of multiple GPS/radio units and their distance from one another as determined by radii rings.

In another embodiment of the invention, the unit 10 is operable to display an indication of the distance between two or more of the units. For example, the distance between the unit 10 and one or more of the other units 10A, 10B, 10C, and 10D may be displayed. This may be accomplished by displaying a plurality of radii rings 42 around the identifier for the unit 10 as depicted in FIG. 5, wherein each of the radii rings corresponds to a pre-determined distance from the unit 10. Each radii ring, for example, may correspond to a distance of 100 yards. In this example, FIG. 5 illustrates that the: unit A4 is approximately 250 yards from unit A1, unit A2 is approximately 450 yards from unit A1, and unit A3 is approximately 550 yards from unit A1. Those skilled in the art will appreciate that any number of radii rings may be displayed, and the radii rings may correspond to any distance. The distance represented by each radii ring and/or the number of radii rings displayed may be selected and changed by way of the input 32. In preferred forms, a distance legend 44 is also displayed to indicate the distance represented by each radii ring 42.

Figure 6:
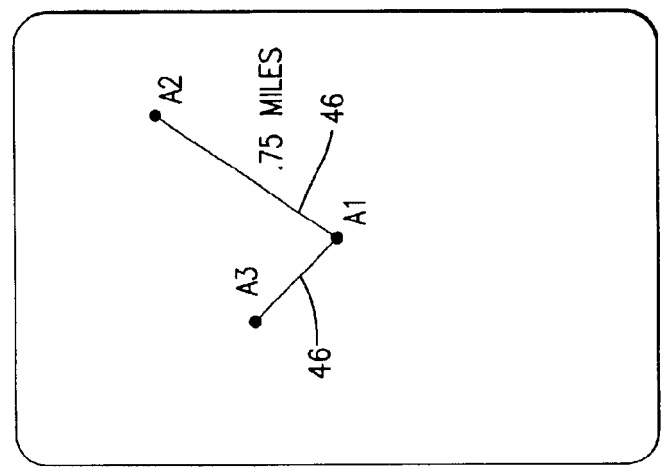
FIG. 6 is a schematic representation of a display on the GPS/radio unit of FIG. 1, wherein the display indicates the location of multiple GPS/radio units and their distance from one another as determined by line segments with textual information indicating distance.

The distance between the unit 10 and other units may also be indicated by line segments 46 extending between the units along with text representative of the distance as illustrated in FIG. 6. For example, the unit 10, which is identified by A1, is shown to be approximately 0.75 miles from the unit identified by A2 and 0.3 miles from the unit identified by A3. A menu-driven display or other input means may be provided so that a user may select for which other units to display a distance indication.

Figure 7:
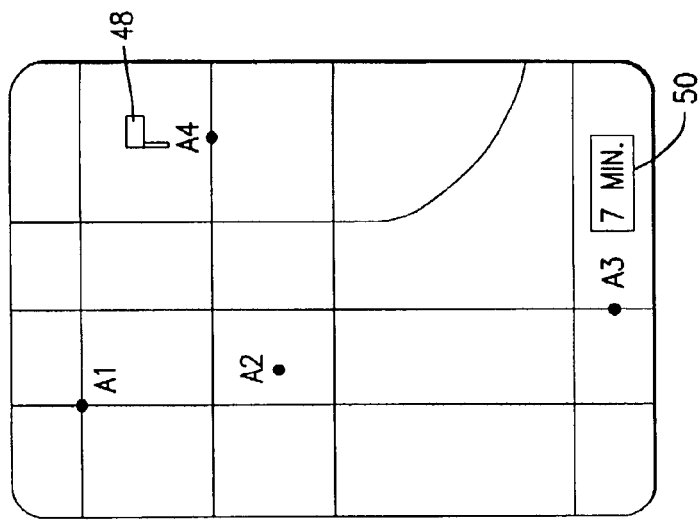
FIG. 7 is a schematic representation of a display on the GPS/radio unit of FIG. 1, wherein the display indicates the location of multiple GPS/radio units and provides alerts such as flags or counters to inform a user thereof that location data has become stale or that certain units are beginning to move outside of communications range.

In another embodiment of the invention, the unit 10 is operable to display an alert or other indication whenever location data for another such unit has become "stale" because it has not been updated within a pre-determined time interval as depicted in FIG. 7. Specifically, the timer 40 counts the time that has elapsed since the last receipt of location data for each of the other units 10A–10E. Whenever location data has not been received from a unit 10A–10E within a pre-determined time interval, an alert is provided to warn the user of the unit 10 that location data for the other unit may be stale or outdated. The alert may take the form of a flag 48 or other marker such as the one displayed alongside the indicator A4, an elapsed time counter 50 that displays the time since location data was last received such as the one displayed alongside the identifier A3, or even color coding, shading, or any other visual indicator that location data has become stale. The display may even remove an indicator whenever location data has not been received for the corresponding unit within a pre-determined time interval. For example, if location data has not been received for the unit corresponding to identifier A2 within 30 minutes, the identifier A2 may be removed entirely from the display. The pre-determined time interval for the above-described alert or indication may be selected as a matter of design choice, but is preferably between 5 minutes and 1 hour.

Figure 9:
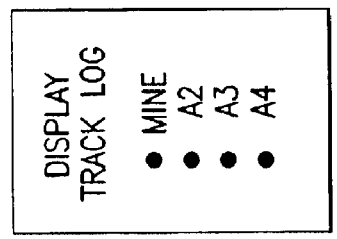
FIG. 9 is a schematic representation of a drop-down menu or other display interface which may be used to alter certain display characteristics of the unit.
Figure 8:
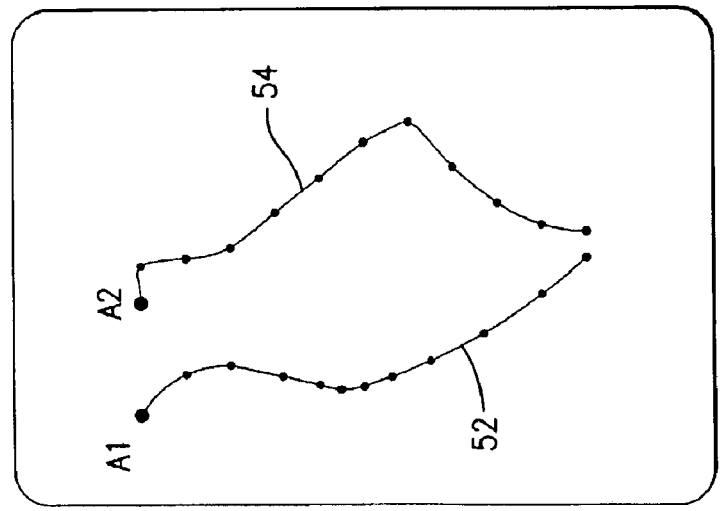
FIG. 8 is a schematic representation of a display on the GPS/radio unit of FIG. 1, wherein the display indicates the location of multiple GPS/radio units and track logs for the units.

In another embodiment of the invention, the unit 10 is operable to display its own track log 52 and to receive and display location data corresponding to a track log 54 for at least one other unit 10A–10E as illustrated in FIG. 8. This allows a user of the unit 10 to not only monitor the current locations of other units but to also determine exactly where the other units have traveled over a pre-determined time interval. Such information may be useful, for example, during search and rescue missions. A drop-down menu or other display interface may be provided as illustrated in FIG. 9 to allow the user of the unit 10 to select which track log to display. Similarly, the unit 10 may be configured to display track-back information for another unit 10A–10E for use in search and rescue missions.

Figure 10:
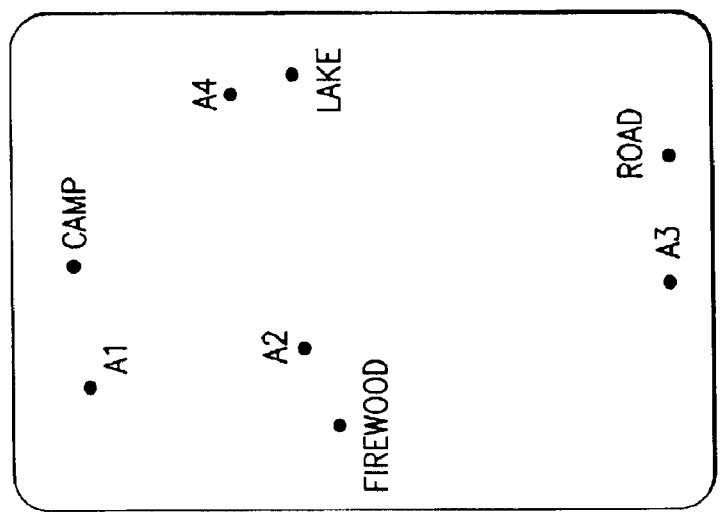
FIG. 10 is a schematic representation of a display on the GPS/radio unit of FIG. 1, wherein the display indicates the location of multiple GPS/radio units and certain way points or other points of interest.

In another embodiment of the invention, the unit 10 is operable to allow a user to gather location data for way points such as bodies of water, campsites, roads, trails, and other points of interest. The user may then transmit the location data for the way points along with textual identifiers to the other units 10A–10E so that all of the units may display location data for the same way points as illustrated in FIG. 10. For example, in the display of FIG. 10, the identifiers A1–A4 depict the location of units 10 and 10A–10C and the identifiers "Camp," "Lake," "Firewood," and "Road" indicate the location of certain way points.

In another embodiment of the invention, the unit 10 is operable to permit a user to select the perspective or vantage point from which location information may be viewed. For example, a user may select to view location data from a plan view as depicted in FIGS. 4, 5, 6, 7, 8, and 10, a highway view (not shown), or any other perspective or vantage point. The unit 10 preferably displays a drop-down menu or other display interface that permits the user to select between various different perspectives or vantage points.

In another embodiment of the invention, the unit 10 is operable to provide an alert or alarm if other units become separated by more than a pre-determined distance from the unit 10. The alert or alarm is based on GPS location data, not received signal strength, and therefore may be configured to provide an alert or alarm before communications are degraded or lost. For example, the pre-determined distance may be set to one mile even though the units have a communication range of two miles so that the alert is triggered before communications are lost or degraded. Various means of providing such an alert or alarm may be used. For example, as illustrated in FIG. 7, the flag 48 or other marker used to identify stale location data may also be used to indicate that a unit is almost out of communications range. Also, the counter 50 may also be used to estimate how soon a unit will be out of communications range based on the current heading and speed of two units relative to one another.

There are many practical applications which could utilize the advantages of the present invention. For example, if a family or other small group is camping or hiking and each person is carrying a GPS/radio unit, then everyone can communicate with one another and see where everyone else is located. Since each person's position, track log, and other location data could be indicated on the electronic map displayed on each of the units, the other members of the group could quickly locate a member who becomes lost or injured. This would also be the case if the group is located in an urban or residential area. Also, because distance information and way points can also be displayed on all the units, the users can easily monitor how far they are from other units and can separate from one another and individually locate way points and other points of interest and transfer such information to one another without requiring each user to personally visit the way points.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A portable GPS/radio unit capable of communicating with at least one other portable GPS/radio unit over a wireless radio network, the GPS/radio unit comprising:

a GPS receiver for receiving satellite signals from a plurality of satellites;

a processor coupled with the GPS receiver for calculating a location of the GPS/radio unit as a function of the satellite signals;

a radio transceiver coupled with the processor and operable for transmitting voice communications to and receiving voice communications from the other GPS/radio unit, and transmitting a radio signal to the other GPS/radio unit indicative of the location of the GPS/radio unit and receiving from the other GPS/radio unit a radio signal indicative of a location of the other GPS/radio unit; and a display coupled with the processor and operable for displaying an indication of the location of the GPS/radio unit, an indication of the location of the other GPS/radio unit, and an indication of a distance between the GPS/radio unit and the other GPS/radio unit, wherein the indication of the distance between the GPS/radio unit and the other GPS/radio unit comprises a plurality of radii rings surrounding the indication of the location of the GPS/radio unit, wherein each of the radii rings is representative of a particular distance from the GPS/radio unit, and wherein the distance represented by each radii ring and a number of radii rings displayed may be selected and changed.

2. The portable GPS/radio unit as set forth in claim 1, wherein the indication of the distance between the GPS/radio unit and the other GPS/radio unit further comprises a distance legend displayed alongside the plurality of radii rings.

3. The portable GPS/radio unit as set forth in claim 1, further comprising a memory coupled with the processor.

4. The portable GPS/radio unit as set forth in claim 1, wherein cartographic data may be stored in the memory and displayed on the display.

5. The portable GPS/radio unit as set forth in claim 1, wherein the wireless radio network is selected from the group consisting of a Family Radio Service (FRS) network, a cellular radio network, and a personal communications service (PCS) network.

6. A portable GPS/radio unit capable of communicating with at least one other portable GPS/radio unit over a wireless radio network, the GPS/radio unit comprising:

a GPS receiver for receiving satellite signals from a plurality of satellites;

a processor coupled with the GPS receiver for calculating a location of the GPS/radio unit as a function of the satellite signals;

a radio transceiver coupled with the processor and operable for—
- transmitting voice communications to and receiving voice communications from the other GPS/radio unit, and
- transmitting a radio signal to the other GPS/radio unit indicative of the location of the GPS/radio unit and receiving from the other GPS/radio unit a radio signal indicative of a location of the other GPS/radio unit;

a timing device for counting an amount of time that has elapsed since the radio signal indicative of the location of the other GPS/radio unit was last received; and a display coupled with the processor and operable for displaying an indication of the location of the GPS/radio unit, an indication of the location of the other GPS/radio unit, and an indication of the amount of time that has elapsed since the radio signal indicative of the location of the other GPS/radio unit was last received, and wherein the indication of the location of the GPS/radio unit and the other GPS/radio unit is displayed on a map, and the indication of the amount of time that has elapsed is a textual counter located proximate to the indication of the other GPS/radio unit.

7. The portable GPS/radio unit as set forth in claim 4, wherein the display is further operable for displaying an indication of a distance between the GPS/radio unit and the other GPS/radio unit.

8. The portable GPS/radio unit as set forth in claim 4, further comprising a memory coupled with the processor.

9. The portable GPS/radio unit as set forth in claim 4, wherein cartographic data may be stored in the memory and displayed on the display.

10. The portable GPS/radio unit as set forth in claim 4, wherein the wireless radio network is selected from the group consisting of a Family Radio Service (FRS) network, a cellular radio network, and a personal communications service (PCS) network.

11. The portable GPS/radio unit as set forth in claim 4, wherein the timing device is coupled with the processor.

12. The portable GPS/radio unit as set forth in claim 4, wherein the timing device is an integral component of the processor.

13. A portable GPS/radio unit capable of communicating with at least one other portable GPS/radio unit over a wireless radio network, the GPS/radio unit comprising:

a GPS receiver for receiving satellite signals from a plurality of satellites;

a processor coupled with the GPS receiver for calculating a location of the GPS/radio unit as a function of the satellite signals;

a radio transceiver coupled with the processor and operable for—
- transmitting voice communications to and receiving voice communications from the other GPS/radio unit, and
- transmitting a radio signal to the other GPS/radio unit indicative of the location of the GPS/radio unit and receiving from the other GPS/radio unit a radio signal indicative of a location of the other GPS/radio unit;

a timing device for counting an amount of time that has elapsed since the radio signal indicative of the location of the other GPS/radio unit was last received; and a display coupled with the processor and operable for displaying an indication of the location of the GPS/radio unit, an indication of the location of the other GPS/radio unit, and an alert indicator if the amount of time that has elapsed is greater than a pre-determined time interval, wherein the indication of the location of the GPS/radio unit and the indication of the location of the other GPS/radio unit is displayed on a map, and wherein the alert indicator comprises a marker displayed alongside the indication of the location of the other GPS/radio unit.

14. The portable GPS/radio unit as set forth in claim 13, wherein the marker comprises a flag.

15. The portable GPS/radio unit as set forth in claim 13, wherein the alert indicator comprises a change in color, brightness, or other characteristic of the indication of the location of the other GPS/radio unit.

16. The portable GPS/radio unit as set forth in claim 13, wherein the timing device is coupled with the processor.

17. The portable GPS/radio unit as set forth in claim 13; wherein the timing device is an integral component of the processor.

18. The portable GPS/radio unit as set forth in claim 13, wherein the pre-determined time interval is between 30 seconds and 60 minutes.

19. A portable GPS/radio unit capable of communicating with at least one other portable GPS/radio unit over a wireless radio network, the GPS/radio unit comprising:

a GPS receiver for receiving satellite signals from a plurality of satellites;

a processor coupled with the GPS receiver for calculating a location of the GPS/radio unit as a function of the satellite signals;

a radio transceiver coupled with the processor and operable for—
- transmitting voice communications to and receiving voice communications from the other GPS/radio unit, and
- transmitting a radio signal to the other GPS/radio unit indicative of the location of the GPS/radio unit and receiving from the other GPS/radio unit a radio signal indicative of a location of the other GPS/radio unit;

a timing device for counting an amount of time that has elapsed since the radio signal indicative of the location of the other GPS/radio unit was last received; and a display coupled with the processor and operable for displaying an indication of the location of the GPS/radio unit and an indication of the location of the other GPS/radio unit, the display being further operable for removing the indication of the location of the other GPS/radio unit if the amount of time that has elapsed is greater than a pre-determined time interval, wherein the pre-determined time interval may be selectively changed.

20. The portable GPS/radio unit as set forth in claim 19, wherein the pre-determined time interval is between 30 seconds and 60 minutes.

* * * * *